US012561779B2

(12) United States Patent
Gong et al.

(10) Patent No.: US 12,561,779 B2
(45) Date of Patent: Feb. 24, 2026

(54) PREDICTING RAILROAD BALLAST FOULING CONDITIONS BASED ON BALLAST IMAGE

(71) Applicant: UNIVERSITY OF SOUTH CAROLINA, Columbia, SC (US)

(72) Inventors: Yufeng Gong, Columbia, SC (US); Yu Qian, Irmo, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 309 days.

(21) Appl. No.: 18/353,275

(22) Filed: Jul. 17, 2023

(65) Prior Publication Data

US 2024/0054628 A1 Feb. 15, 2024

Related U.S. Application Data

(60) Provisional application No. 63/397,135, filed on Aug. 11, 2022.

(51) Int. Cl.
| | |
|---|---|
| *G06T 7/00* | (2017.01) |
| *E01B 35/00* | (2006.01) |
| *G06T 7/90* | (2017.01) |

(52) U.S. Cl.
CPC ............ *G06T 7/0002* (2013.01); *E01B 35/00* (2013.01); *G06T 7/90* (2017.01); *G06T 2207/20084* (2013.01)

(58) Field of Classification Search
CPC .................... G06T 7/0002; G06T 7/90; G06T 2207/20081; E01B 35/00
(Continued)

(56) References Cited

U.S. PATENT DOCUMENTS

2024/0083478 A1* 3/2024 Liu ........................ G06V 20/52

FOREIGN PATENT DOCUMENTS

| CN | 112044723 B | * | 4/2022 | ............... B07B 1/04 |
|---|---|---|---|---|
| EP | 2907920 A1 | * | 8/2015 | ........... E01B 27/102 |
| JP | 2022157322 A | * | 10/2022 | |

OTHER PUBLICATIONS

Daniela Ionescu "Ballast degradation and measurement of ballast fouling".In Seventh Railway Engineering Conference, Commonwealth Institute, London, 2004. pp. 169-180.
(Continued)

*Primary Examiner* — Jamares Q Washington
(74) *Attorney, Agent, or Firm* — DORITY & MANNING, P.A.

(57) ABSTRACT

Evaluating railway ballast fouling condition is critical to assessing track conditions and arranging proper ballast maintenance. Because fouled ballast materials with different fouling conditions have different material properties, these properties can be used to evaluate the fouling severity. Various previously developed approaches to estimating fouling conditions often require special sensors or equipment, and well-trained technicians. Recently, convolutional neural network (CNN) based computer vision approaches have performed particle segmentation to obtain ballast grain size distribution. While the coarse aggregate fraction can be evaluated, many such approaches do not segment fine particles. This disclosure is an image analysis approach to directly estimate the ballast fouling conditions. First, fouled ballast images with different fouling conditions are taken as the reference. Then, the RGB color distributions of the fouled ballast images are processed through statistical analysis. A strong linear correlation between Fouling Index (FI) and Variance is found and used to establish an FI prediction
(Continued)

model which has been tested and validated by additional fouled ballast samples.

20 Claims, 11 Drawing Sheets
(5 of 11 Drawing Sheet(s) Filed in Color)

(58) Field of Classification Search
USPC ........................................................ 382/156
See application file for complete search history.

(56) References Cited

OTHER PUBLICATIONS

F.J. Sigworth "A maximum-likelihood approach to single-particle image refinement". Journal of structural biology, vol. 122, No. 3, 1998, pp. 328-339.

Hyslip et al. "Assessment of railway track substructure condition using ground penetrating radar".In 2003 Annual Conference of AREMA, Citeseer, 2003.

Leng et al. "Railroad ballast evaluation using ground-penetrating radar: laboratory investigation and field validation". Transportation Research Record, vol. 2159, No. 1, 2010, pp. 110-117.

Qian et al. "Characterizing ballast degradation through Los Angeles abrasion test and image analysis". Transportation Research Record, vol. 2448, No. 1, 2014, pp. 142-151.

Roberts et al. "Railroad ballast fouling detection using ground penetrating radar—a new approach based on scattering from voids". In Ninth European Conference on NDT, Citeseer, 2006.

Stark et al "Evaluating fouled ballast using seismic surface waves". In ASME/IEEE Joint Rail Conference, No. 49675, American Society of Mechanical Engineers, 2016.

Sussman et al. "Use of seismic surface wave testing to assess track substructure condition". Construction and Building Materials, vol. 155, 2017, pp. 1250-1255.

Sussmann et al. "Source of ballast fouling and influence considerations for condition assessment criteria". Transportation Research Record, vol. 2289, No. 1, 2012, pp. 87-94.

Tennakoon et al. "Behaviour of clay-fouled ballast under cyclic loading". Géotechnique, vol. 64, No. 6, 2014, pp. 502-506.

Tutumluer et al. "Laboratory characterization of coal dust fouled ballast behavior" .In AREMA 2008 Annual Conference & Exposition, 2008. pp. 21-24.

Han et al. "Investigation of the effects of fouling material and degree of fouling on the settlement of ballast bed by ballast box". Project Report No. AAR95-426R for Association of American Railroads. University of Massachusetts, Amherst, 1996.

Indraratna et al. Abstract of "Advanced rail geotechnology-ballasted track". CRC press, 2011.

Selig et al. Abstract of "Track Geotechnology and Substructure Management". Thomas Telford, 1994.

Al-Thyabat et al. "An improved estimation of size distribution from particle profile measurements". Powder technology, vol. 166, No. 3, 2006, pp. 152-160.

De Bold et al. "Using impulse response testing to examine ballast fouling of a railway trackbed". Construction and Building Materials, vol. 274, 2021, p. 121888.

Kashani et al. "Fouling and water content influence on the ballast deformation properties". Construction and Building Materials, vol. 190, 2018, pp. 881-895.

Kashani et al. "Laboratory evaluation of railroad ballast behavior under heavy axle load and high traffic conditions". Transportation Geotechnics, vol. 11, 2017, pp. 69-81.

Liu et al. "Quantitative comparison of image analysis methods for particle mixing in rotary drums". Powder technology, vol. 282, 2015, pp. 32-36.

Mertens et al. "Use of computer assisted image analysis for the determination of the grain-size distribution of sands used in mortars". Cement and Concrete Research, vol. 36, No. 8, 2006, pp. 1453-1459.

Qian et al. "Triaxial testing of new and degraded ballast under dry and wet conditions". Transportation Geotechnics, vol. 34, 2022, p. 100744.

Zelin Zhang "Particle overlapping error correction for coal size distribution estimation by image analysis". International Journal of Mineral Processing, vol. 155, 2016, pp. 136-139.

Zeng et al. "Identification of ballast condition using SmartRock and pattern recognition". Construction and Building Materials, vol. 221, 2019, pp. 50-59.

Zheng et al. "Soil particle size and shape distributions by stereophotography and image analysis". Geotech. Test. J, vol. 40, No. 2, 2017, pp. 317-328.

* cited by examiner

I          II          III          IV          V          VI

PREDICTING RAILROAD BALLAST FOULING CONDITIONS BASED ON BALLAST IMAGE

PRIORITY CLAIM

The present application claims the benefit of priority of U.S. Provisional Patent Application No. 63/397,135, titled Predicting Railroad Ballast Fouling Conditions Based On Ballast Image, filed Aug. 11, 2022, and which is fully incorporated herein by reference for all purposes.

STATEMENT REGARDING SPONSORED RESEARCH OR DEVELOPMENT

This invention was made with Government support under grant number 693JJ621C000007, awarded by the Federal Railroad Administration. The Government has certain rights in this invention.

BACKGROUND OF THE PRESENTLY DISCLOSED SUBJECT MATTER

Evaluating railway ballast fouling conditions are critical to assessing track conditions and arranging proper ballast maintenance. The fouled ballast affects the performance of the track and accelerates track deterioration. Hence, regular ballast maintenance activities are required, and the specific maintenance activity selection depends on the fouling severity. To quantify the fouling severity is important to schedule proper maintenance activity at the proper timeframes.

Because fouled ballast materials with different fouling conditions have different material properties, these properties can be used to evaluate the fouling severity. Various previously developed approaches to estimating fouling conditions often require special sensors or equipment, and well-trained technicians. Recently, convolutional neural network (CNN) based computer vision approaches have performed particle segmentation to obtain ballast grain size distribution. While the coarse aggregate fraction can be evaluated, many such approaches do not segment fine particles.

Approaches using ground penetration radar, impulse response, surface wave, and SmartRock® have been previously developed to estimate the fouling conditions. Those methods require special sensors or equipment, and well-trained technicians, so they are very expensive.

The currently existing image-based ballast fouling prediction approaches are particle segmentation-based methods. Such prior models identify and segment individual particles to a specific size to quantify the ballast grain size distribution, and then use the quantified grain size distribution to calculate ballast fouling conditions. The camera resolution limits their accuracy and particle segmentation algorithm, especially the fine particles (typically finer than 1 mm), cannot be captured or segmented; thus, they are not accurate and in any event require sophisticated models.

More specifically, railway ballast is constructed with uniformly graded coarse aggregates, which supports the crossties (1). The primary function of the ballast layer is to transfer the train loads to the subgrade and to drain water away from the track. New ballast has very limited fine particles, especially particles smaller than No. 4 sieve. Fine particles in the ballast layer will cause many track issues, such as mud pumping, excessive settlement, and reduced modulus (2-6). Unfortunately, ballast particle abrasion and breakage are inevitable as the train loads accumulate (1; 7;

8). Besides, fines like clay and coal dust may get mixed ballast particles under dynamic train loads (1; 7; 8). The process that these fines mix the ballast particles is referred to as ballast fouling. With fouling increasing, fines will progressively occupy the voids in the ballast layer and may even prevent effective contact between the ballast particles.

Fouled ballast affects track performance and can accelerate track deterioration (3-6; 9). Hence, regular ballast maintenance activities are required, and the specific maintenance activity selection depends on the fouling severity. Fouling Index (FI) introduced by Selig and Waters is the summation of accumulating percentage passing of No. 4 and No. 200 sieves and is a well-accepted parameter to quantify the fouling condition (1). There are different approaches to evaluating FI values, which can be classified into two groups. One group is to perform the sieving or similar activities to determine FI (10; 11). The other group is to correlate FI to a certain ballast property that is relatively easier to quantity. Then, the FI value can be estimated by measuring the correlated ballast properties. Several properties have been found to be related to FI, such as the reflection of electromagnetic waves, the forced-vibration characteristics, the surface wave characteristics, and the particle movement patterns. These properties can be assessed with Ground Penetration Radar (GPR) (12-14), Impulse Response (IR) (15), Spectral Analysis of Surface Wave (SASW) (16; 17), and SmartRock measurements (18), respectively.

Other than the abovementioned approaches, image processing technologies are also be applied to quantify FI. Due to the particulate nature of ballast, much effort has been put into characterizing the size and shape of particles by identifying and segmenting individual particles. Sigworth proposed a maximum-likelihood approach to identify randomly positioned and oriented particles from a noisy gray-scale image (19). Al-Thyabat and Miles estimated particle sizes by measuring two parameters, equivalent area and mean Feret's diameter, through the binary image. But they cannot deal with overlapped particles (20). Mertens and Elsen provided an algorithm to transfer micrographs into a binary image and obtained the particle size distribution by identifying every particle in the image (21). Qian et al. quantified ballast shape indices for one particle through pictures taken by an enhanced aggregate image analyzer (11). Liu et al. applied optical imaging to study the particle mixing dynamics with red/white binary-colored particles, avoiding segmentation in post-processing (22). Zhang proposed a new method to segment particles from a picture with particle overlapping and got the particle size distribution by correcting the particle overlapping error (23). Zheng and Hryciw developed a stereophotography system to acquire the precise 3D surfaces of non-overlapped particles and to segment contacting particles (24).

All of such prior methods have paid a lot of attention to particle segmentation and acquiring particle size or shape information afterward through a binary image. On the one hand, much information has been filtered or discarded during image processing. Especially if transferring a color image to a binary image, the computational cost is reduced, but some information may get wasted. On the other hand, those approaches can well describe large particles but cannot quantify small particles below a specific size. Thus, it is still challenging to use segmentation-based computer vision approaches to quantify FI of the fouled ballast to a satisfying accuracy.

Unlike particle segmentation-based approaches, this presently disclosed subject matter proposes a novel image processing method to predict the FI of the fouled ballast based on the overall image characteristics instead of individual particles.

Summary of the Presently Disclosed Subject Matter

Aspects and advantages of the presently disclosed subject matter will be set forth in part in the following description, or may be apparent from the description, or may be learned through practice of the presently disclosed subject matter.

Broadly speaking, the presently disclosed subject matter generally relates to methodology for predicting railroad ballast fouling conditions, and in some embodiments more specifically relates to such predicting based on ballast images.

Other relatively broad aspects of the presently disclosed subject matter relate to an image analysis approach to directly estimate the ballast fouling conditions.

Different from the currently available particle segmentation-based approaches, the presently disclosed method is in some embodiments based on the overall image characteristics instead of individual particles.

Different from prior particle segmentation-based approaches, the presently developed and disclosed image processing method predicts the fouling severity of the fouled ballast based on the overall image characteristics instead of individual particles. Depending on the fouling conditions, the combination of ballast particles, fines, and voids will determine the sample appearance, which can be quantified by the frequency distributions of the color channels-red, green, and blue, respectively. Images of ballast samples having different fouling conditions are processed through statistical analysis. The presently disclosed method is not limited by the fine particle sizes as prior particle-segmentation methods would face. A strong linear correlation between fouling severity and variance is determined to exist. Therefore, a presently disclosed railroad ballast fouling severity prediction model is established based on the correlation between fouling severity and variance. The computational expense for the presently disclosed subject matter is also significantly less than prior particle-segmentation methods.

In accordance with the presently disclosed subject matter, the quantity of aggregated fine particles can be predicted from a photo of the aggregates. Instead of segmenting each individual particle out, the presently disclosed method analyzes the overall appearance of the aggregates. For example, if there are fewer fine particles/dust, there are resulting big aggregates and gaps between them which can be seen clearly. If there are more fine particles/dust, a picture is seen to have a more consistent appearance as fine particles take (fill) all the voids.

Some presently disclosed embodiments relate to an image analysis approach to directly estimate the ballast fouling conditions. First, fouled ballast images with different fouling conditions are taken as the reference. Then, the RGB color distributions of the fouled ballast images are processed through statistical analysis. A strong linear correlation between Fouling Index (FI) and Variance is found and used to establish an FI prediction model which has been tested and validated by additional fouled ballast samples.

One presently disclosed exemplary methodology preferably relates to a method for evaluating railway ballast fouling conditions for assessing track conditions for determining proper ballast maintenance. Such exemplary method preferably comprises training a machine-learned computer vision-based convolutional neural network (CNN) model to directly estimate ballast fouling conditions using an image analysis approach based on overall image characteristics;

obtaining an overall image associated with a target section of railway ballast to be evaluated; inputting the overall image associated with the target section of railway ballast into the machine-learned computer vision-based convolutional neural network (CNN) model; and receiving, as output of the CNN model, estimation of the ballast fouling conditions of the target section of railway ballast.

It is to be understood from the complete disclosure herewith that the presently disclosed subject matter equally relates to both methodology and corresponding and related system or apparatus.

Other example aspects of the present disclosure are directed to systems, apparatus, tangible, non-transitory computer-readable media, user interfaces, memory devices, and electronic smart devices or the like. To implement methodology and technology herewith, one or more processors may be provided, programmed to perform the steps and functions as called for by the presently disclosed subject matter, as will be understood by those of ordinary skill in the art.

One presently disclosed exemplary embodiment relates to a system for evaluating railway ballast fouling conditions for assessing track conditions for determining proper ballast maintenance. Such system preferably may comprise a machine-learned computer vision-based convolutional neural network (CNN) model trained to directly estimate ballast fouling conditions using an image analysis approach based on overall image characteristics; one or more processors; and one or more non-transitory computer-readable media that store instructions that, when executed by the one or more processors, cause the one or more processors to perform operations. Such operations preferably comprise obtaining an overall image associated with a target section of railway ballast to be evaluated; inputting the overall image associated with the target section of railway ballast into the machine-learned computer vision-based convolutional neural network (CNN) model; and receiving, as output of the CNN model, estimation of the ballast fouling conditions of the target section of railway ballast.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

The patent or application file contains at least one drawing executed in color. Copies of this patent or patent application publication with color drawing(s) will be provided by the Office upon request and payment of the necessary fee.

A full and enabling disclosure of the presently disclosed subject matter, including the best mode thereof, directed to one of ordinary skill in the art, is set forth in the specification, which makes reference to the appended Figures, in which.

Figure 1:
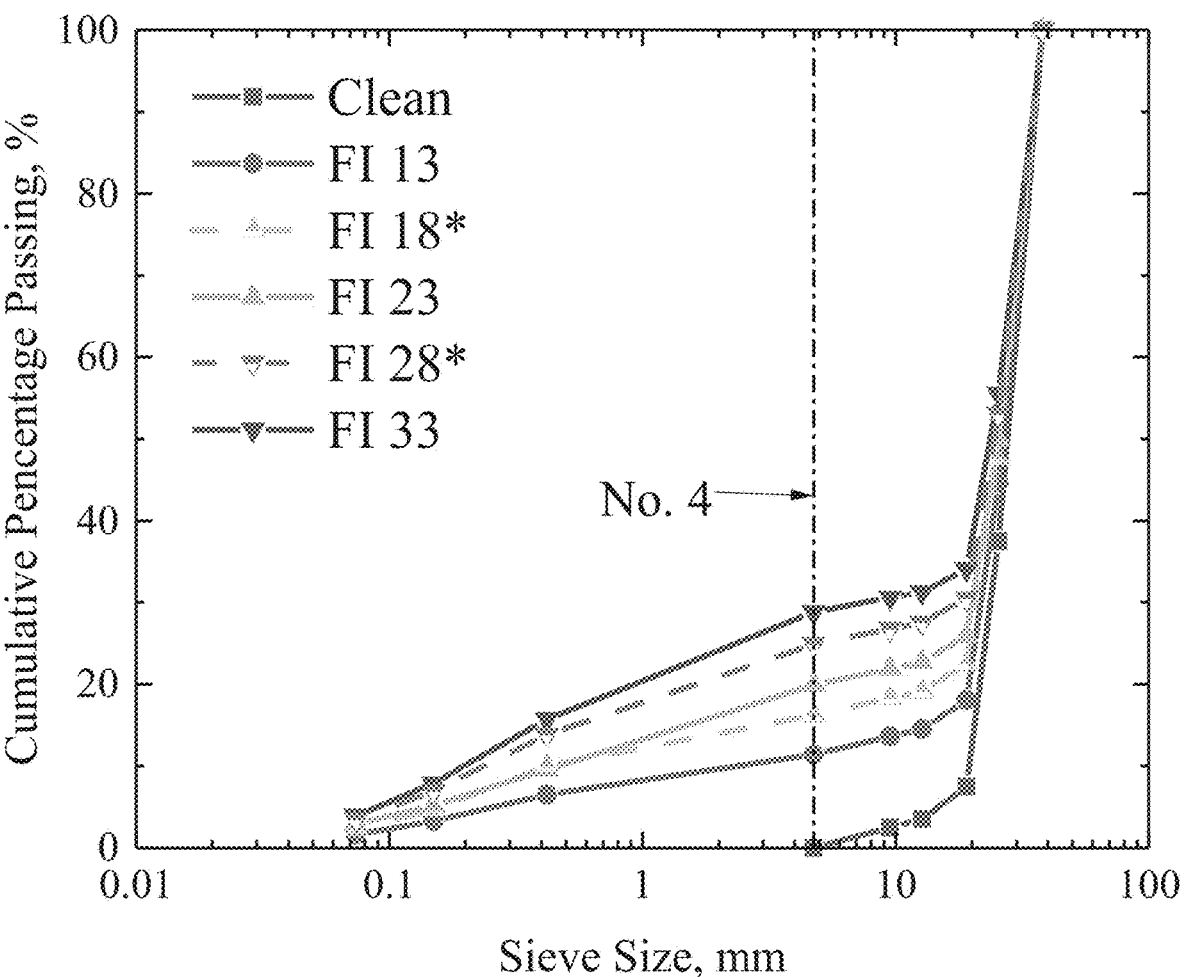
FIG. 1 is a graphical representation of the gradation of exemplary sample ballast materials as referenced in the presently disclosed subject matter.
Figure 2A:
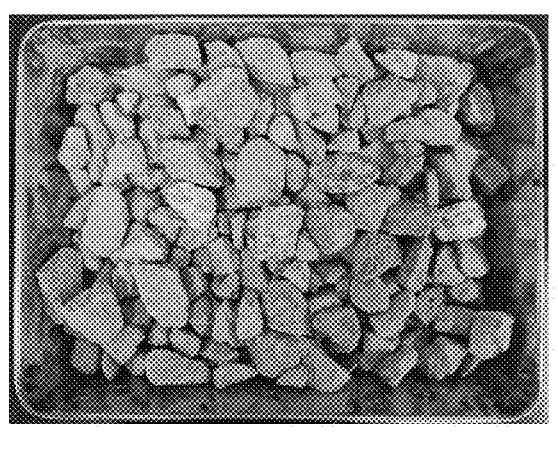
FIGS. 2(a) through 2(f) illustrate six respective images of six different fouled ballast samples having different FI values used in accordance with the disclosure herewith.
Figure 2B:
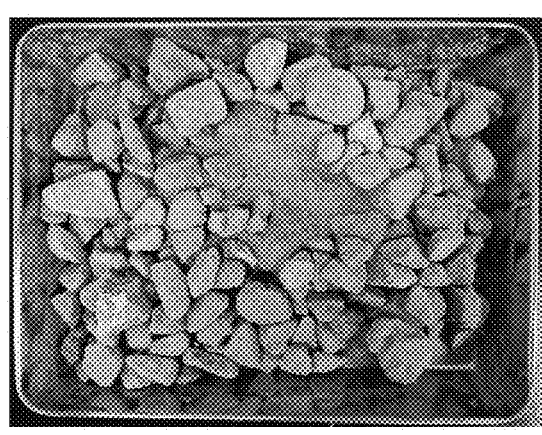
Figure 2C:
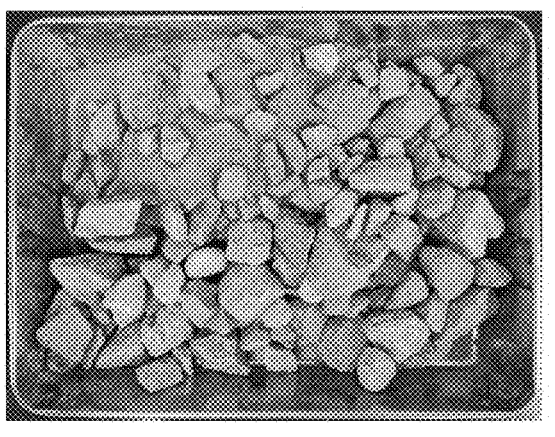
Figure 2D:
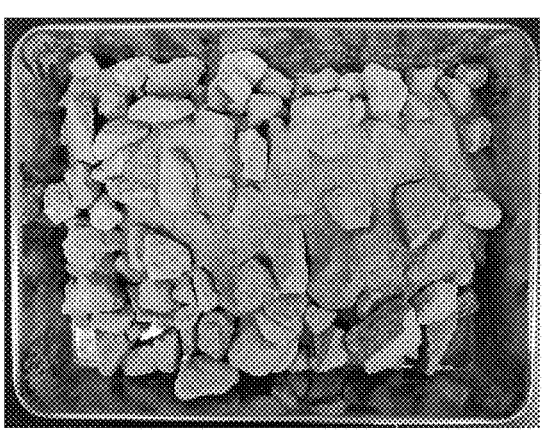
Figure 2E:
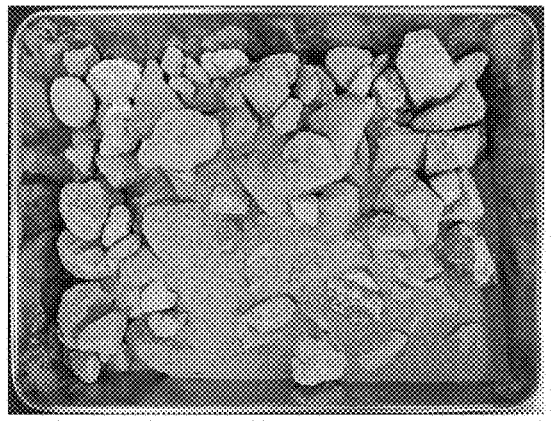
Figure 2F:
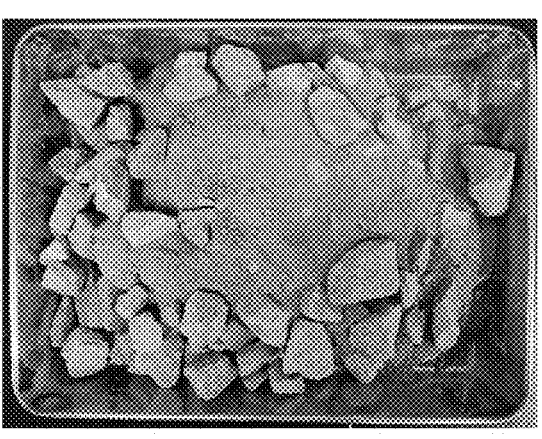

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only, and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to image processing methodology to predict the Fouling Index (FI) of the fouled ballast based on the overall image characteristics instead of individual particles.

Ballast Image Acquisition

Ballast Material

The ballast material used as discussed herein was provided by M×V Rail (formerly Transportation Technology Center, Inc.) from the Rainy Section test track at TTC. According to the Fouling Index (FI) definition, those particles smaller than No. 4 sieve can be considered fine particles. The fine particles of the Rainy Section material are mostly non-plastic materials from ballast aggregate degradation and a small portion of subgrade materials, and the specific gravity is 2.75. A clean ballast gradation, which meets AREMA No. 4 gradation requirements, is given in FIG. 1, and this clean ballast gradation is the same as the coarse aggregate fraction of all the fouled ballast shown in FIG. 1. The only difference between the different ballast samples is the content of the fine particles (particles passing No. 4 sieve). FIG. 1 is a graphical representation of the gradation of sample Rainy Section ballast materials.

FIGS. 2(a) through 2(f) illustrate six respective images of six different fouled ballast samples having different FI values used in accordance with the disclosure herewith. All the samples have identical large particles. The only difference between the samples is the additional amount of fines added to achieve different FI values. Of the six ballast samples prepared, one is completely clean and five are fouled samples (and collectively correspond with the six samples indicated per FIG. 1). Among the fouled samples, FI 13, FI 23, and FI 33 were used to explore potential correlations between FI and image parameters. The samples with FI 18 and FI 28 are reserved for testing and validation of possible correlations identified based on other samples. A star symbol (*) is used in FIG. 1 to indicate samples for validation only.

Test Setup

Figure 3A:
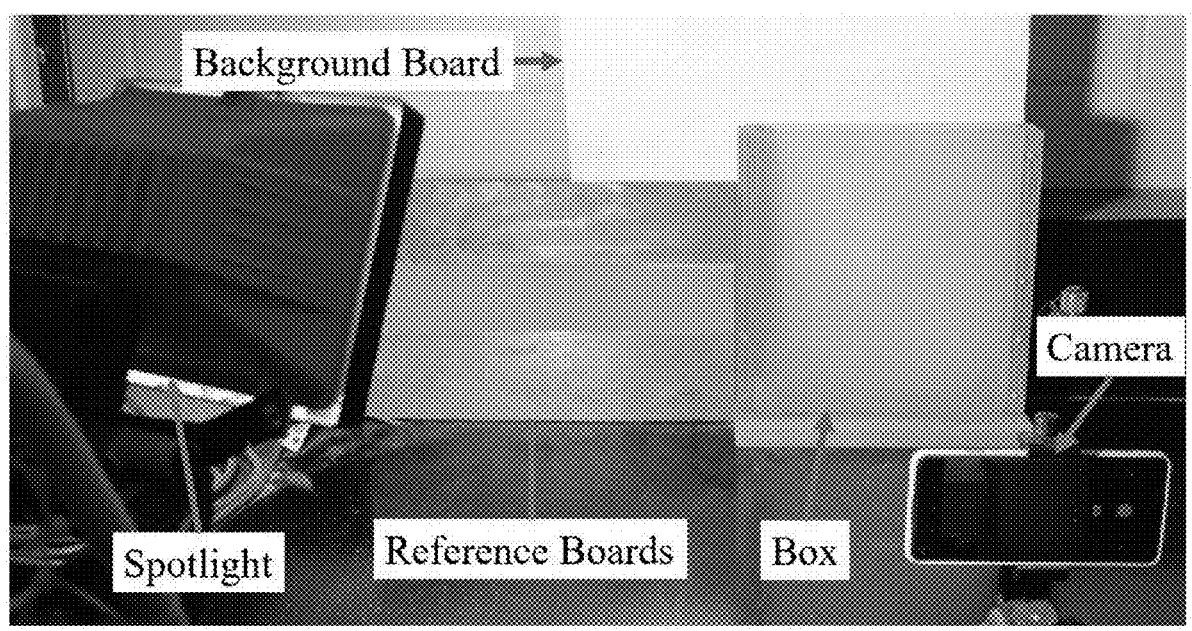
FIG. 3(a) is an image of a presently disclosed test setup for image analysis.
Figure 3B:
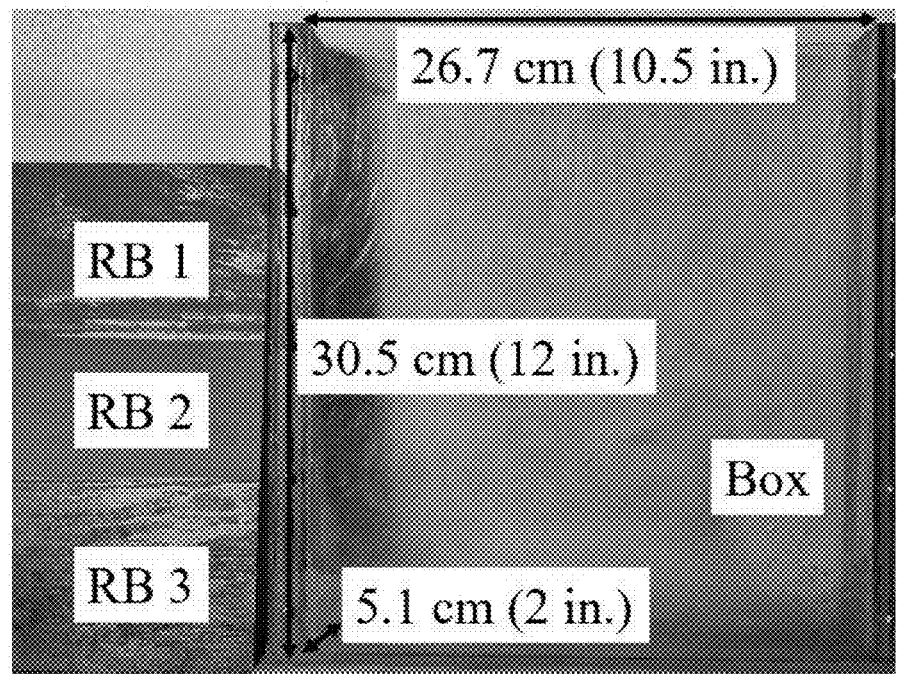
FIG. 3(b) is a raw image example for a box test, and illustrating exemplary test box dimensions in accordance with presently disclosed subject matter.

FIG. 3(a) is an image of a presently disclosed test setup for image analysis. FIG. 3(b) is a raw image example for a box test, and illustrating exemplary test box dimensions. After each of the six samples were prepared, the ballast material was transferred into an acrylic box (FIG. 3(a)), to take images. The size of the exemplary box was 26.7 cm (10.5 in.) in height, 30.5 cm (12 in.) in width, and 5.1 cm (2 in.) in depth, as shown in FIG. 3(b). All samples were lightly tamped with caution to the same volume to avoid scratching the acrylic glasses or damaging the box. Note the void ratio of the clean ballast was 1.0. The void ratios of other samples would decrease depending on FI.

While various digital imaging devices could be used, in this instance a smartphone was used to take images of the samples in the acrylic box and the reference boards together. For every fouling condition, the mixed materials shown in FIGS. 2(a)-2(f) were re-packed three times to prepare three samples with identical particles (both large particles and fines) but with different particle arrangements. For every sample in the box, one picture was taken from each side of the acrylic box. In other words, for every fouling condition, three samples were prepared; for each sample, two images were taken. In total, 24 images were collected for model development, and another 12 images were collected for model validation. Table 1 summarizes the image matrix.

TABLE 1

| Ballast Sample and Image Matrix | | | | | |
|---|---|---|---|---|---|
| | Type | | | | |
| | Model | | | Validation | |
| | Fouling Condition | | | | |
| | Clean/ FI 0 | FI 13 | FI 23 | FI 33 | FI 18* | FI 28* |
| Sample Count | 3 | 3 | 3 | 3 | 3 |
| Image Count | 6 | 6 | 6 | 6 | 6 |

Ballast Image Analysis

FIG. 3(*b*) shows an example raw image taken by the camera. Each raw image from the camera is divided into four images, covering the Box, Reference Board 1 (RB1, red), Reference Board 2 (RB2, green), and Reference Board 3 (RB3, blue), respectively. The image size of the box is 2500×2800 pixels. The other three images of reference boards serve as the reference to ensure a consistent illumination condition.

Figure 4:
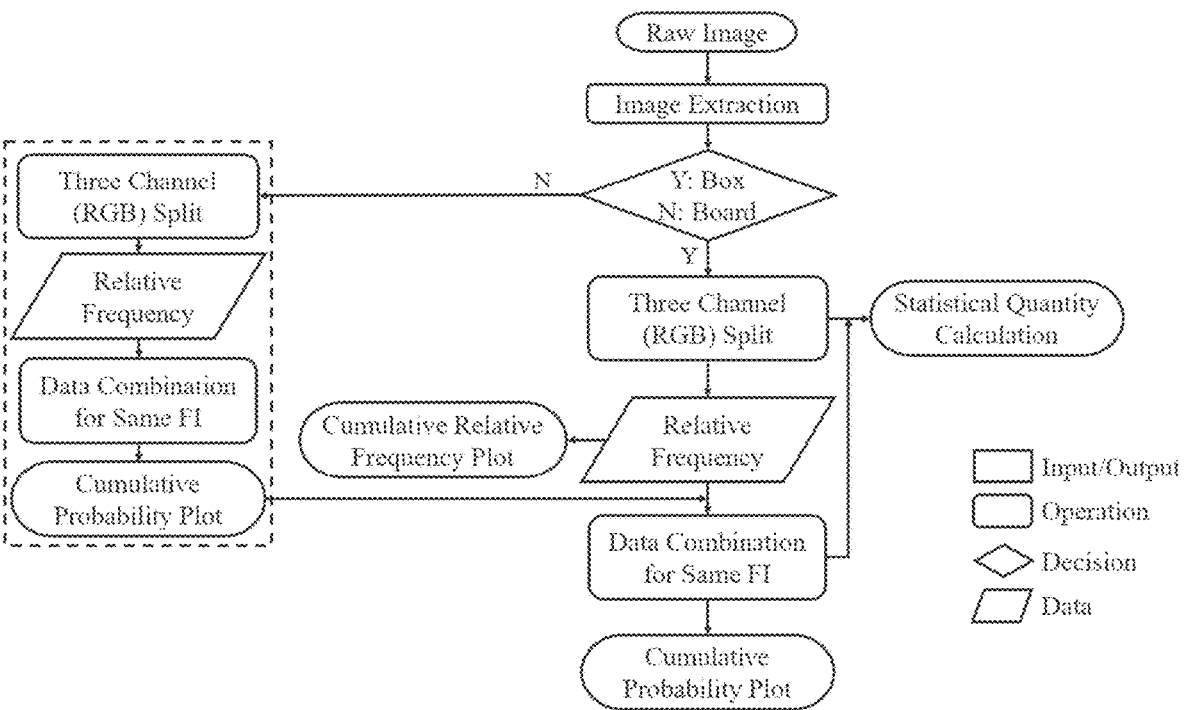
FIG. 4 is a diagrammatical flowchart of the presently disclosed image analysis methodology.

FIG. 4 shows the image analysis procedures in this subject disclosure, mainly having two tasks. One is the RGB-based characterizing under different fouling conditions, and the other is the illumination consistency check from reference boards. Consistent illumination is critical for fair comparisons and exploring representative correlations. Thus, FIG. 4 is a diagrammatical flowchart of the presently disclosed image analysis methodology.

RGB values are obtained for each image of the ballast sample. For example, the box covers 2,500×2,800 pixels. Each pixel has three values for each RGB channel, ranging from $[0,1]×[0,1]×[0,1]$. In other words, every box image has three data sets corresponding to the red, green, and blue channels, respectively. Each data set has $7×10^6$ data points. Every data point ranges from 0 to 1, representing the intensity of each color channel (red, green, or blue). Each data set is labeled with four parameters: 1) Fouling Index; 2) color channel; 3) sample number; and 4) image number. All in all, for model development, there are 4 (fouling conditions)×3 (color channels)×6 (images)×4 (image content, sample or reference boards)=288 data sets. Each data set will be analyzed and grouped according to different categories.

By grouping the fouling condition and the color channel, data sets from different reference boards are checked to show the illumination consistency of the images. If the illumination is consistent, the data set from the sample box will be used to generate the cumulative relative frequency curves. These curves could show a certain pattern if there is a potential correlation between the fouling conditions and the images.

By grouping the fouling condition and the color channel, all six data sets of different samples having the same fouling condition can be merged into one data set $\{x_i\}$ with size N. The cumulative relative frequency should represent the cumulative probability and vary following a certain pattern if there is any correlation between the fouling conditions and the image RGB value distributions. Otherwise, the fouling conditions and the image RGB value distribution are not correlated. For every merged data set of a ballast mixture, five statistical parameters are calculated as the following:

Mean, μ:

$$\mu = \frac{1}{N}\sum_{i=1}^{N} x_i \tag{1}$$

Median, m:

$$m = \mathrm{sort}(x_i)_{\frac{N}{2}} \tag{2}$$

Variance, $\sigma^2$:

$$\sigma^2 = \frac{1}{N}\sum_{i=1}^{N}(x_i - \mu)^2 \tag{3}$$

Skewness, s:

$$s = \frac{\frac{1}{N}\sum_{i=1}^{N}(x_i - \mu)^3}{\left[\frac{1}{N}\sum_{i=1}^{N}(x_i - \mu)^2\right]^{3/2}} \tag{4}$$

Kurtosis, k:

$$k = \frac{\frac{1}{N}\sum_{i=1}^{N}(x_i - \mu)^4}{\left[\frac{1}{N}\sum_{i=1}^{N}(x_i - \mu)^2\right]^2} \tag{5}$$

where N=6 (image count)×2500 (width of sample)×2800 (height of sample)=$4.2×10^7$.

The foregoing five quantities quantify the probability distribution statistically. Mean, and Median indicate the location of every distribution. Variance measures how far the data spread away from Mean. Skewness is a measure of the asymmetry of the data set and is related to the difference between Mean and Median. Kurtosis shows the size of the tails of a distribution. The distribution of a higher peak value has larger tails. This disclosure investigates whether these statistical quantities reflect the change in fouling conditions and quantifies the fouling index statistically.

Results and Discussion

Figure 5A:
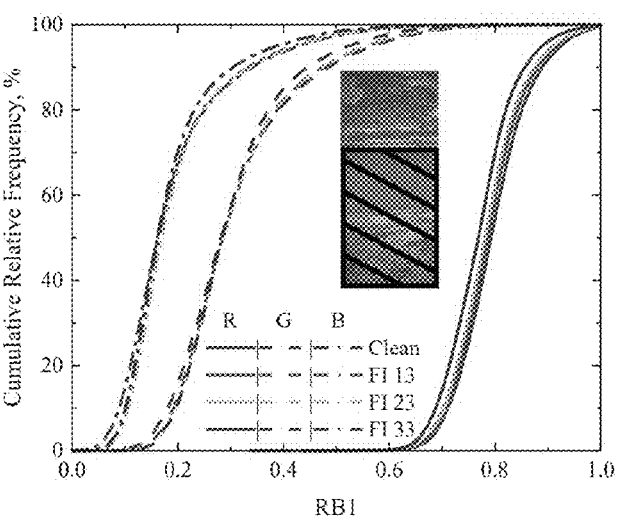
FIGS. 5(a) through 5(c) respectively graphically illustrate cumulative relative frequency distributions of reference boards, regarding respective different color channels, all related to the presently disclosed subject matter.
Figure 5B:
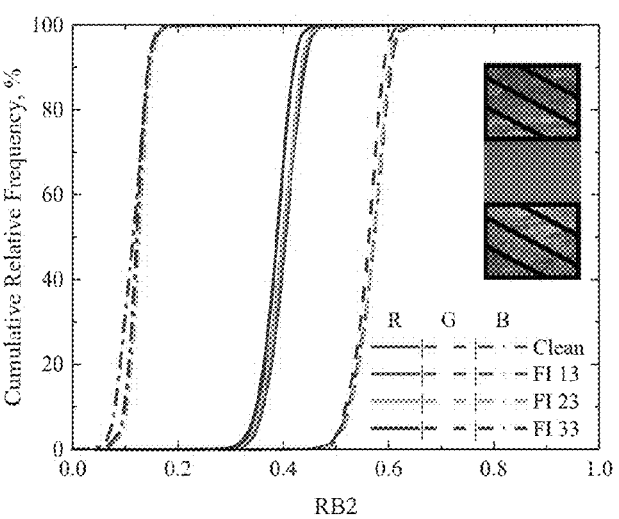
Figure 5C:
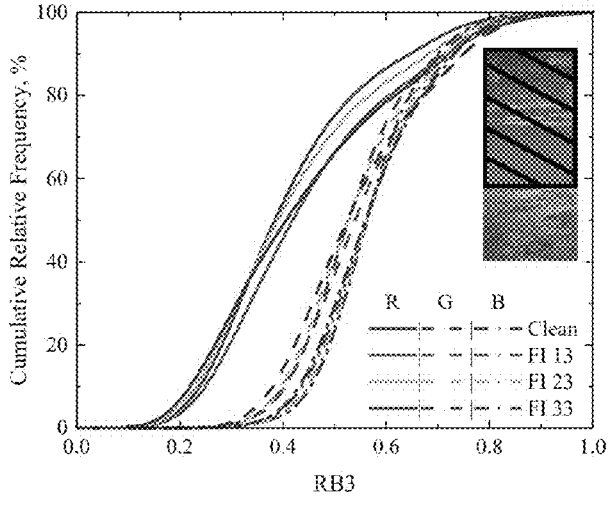
Figures 6A, 6B, 6C, 6D, 6E, 6F:
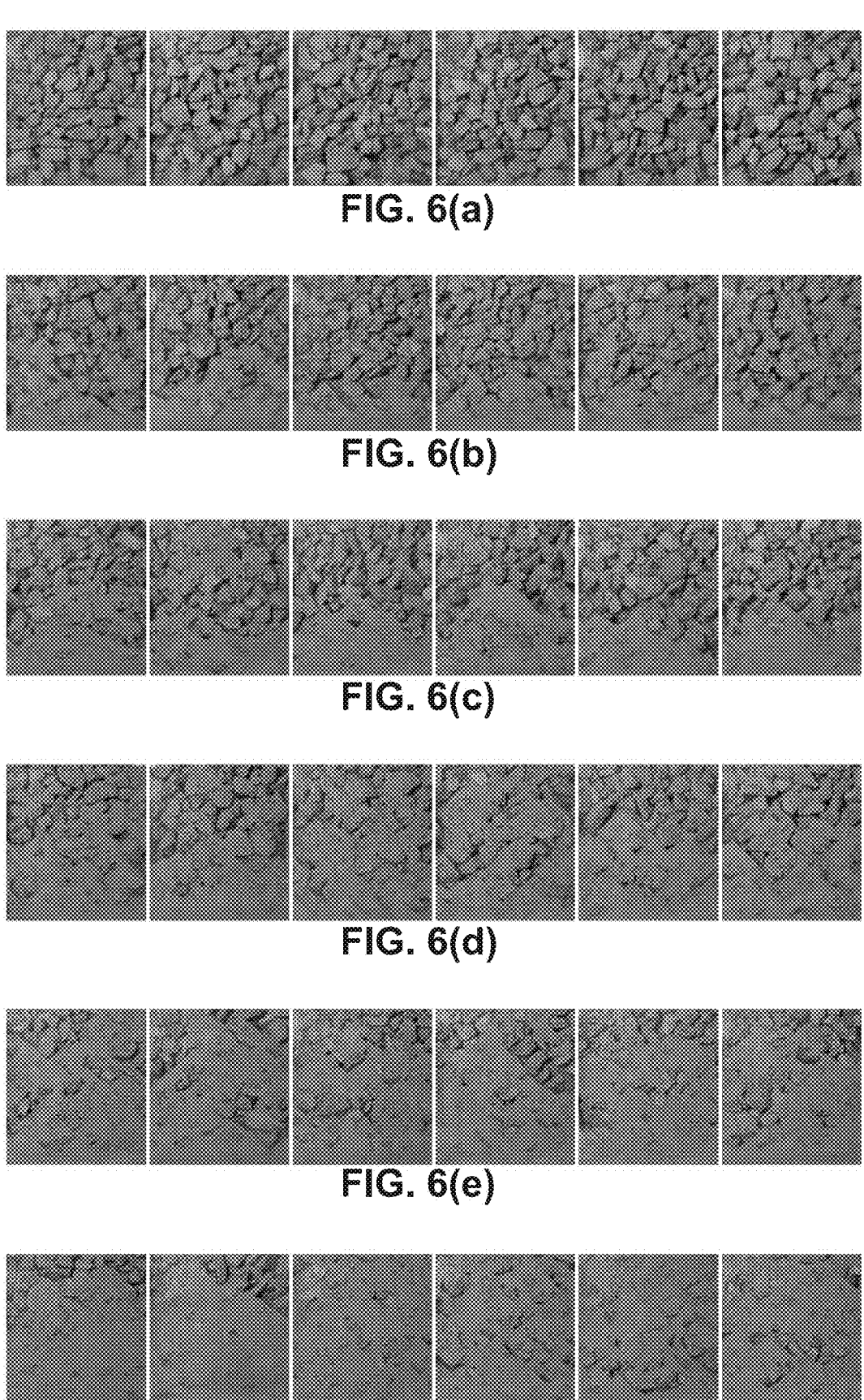
FIGS. 6(a) through 6(f) represent images showing all the extracted sample images, representing extracted box images under different fouling conditions.

FIGS. 5(*a*) through 5(*c*) respectively graphically illustrate cumulative relative frequency distributions of reference boards, regarding respective different color channels. The content represented by FIGS. 5(*a*) through 5(*c*) relate to illumination consistency check. As illustrated, curves from different color channels are plotted with different line types. Note the FI in the legend indicates with which fouling condition it is associated. As a methodology, first, three reference boards are painted with different (respective) colors. From FIGS. 5(*a*) through (*c*), the color channel with the largest value indicates the strongest color intensity, which matches the paint color very well. Second, four curves with different fouling conditions for each color channel show a consistent distribution. There is no significant varying trend relating to FI. Therefore, FIGS. 5(a) through 5(c) confirm that the illumination condition for all the images is consistent regardless of which sample is put in the acrylic box. Thus, the illumination condition would not introduce significant variation in the sample images.

After confirming the consistent illumination condition, the sample images can be analyzed and fairly compared. FIGS. 6(a) through 6(f) represent images showing all the extracted sample images, representing extracted box images under different fouling conditions. For every big particle, its position and size can be distinguished by the color difference with those voids and particles adjacent to it. However, it is harder to distinguish individual particles once the particle size gets smaller. The challenge exists in not only particle segmentation but also the pixel values of the voids, and the fines may get closer with higher fine contents. This is exactly why particle segmentation-based approaches cannot work with fine particles. Moreover, particle segregation issues often handicap particle segmentation-based approaches as well.

Because gravity is inevitable, the fine particles tend to accumulate at the bottom, leaving fouling conditions not spatially consistent for lightly and moderately fouled samples. For example, although FI 13 and FI 18 samples are light to moderately fouled, the bottom is similar to FI 28 and FI 33 samples, but the top is close to the Clean sample. It is possible for particle segmentation-based approaches to only read the relatively clean top area but cannot output meaningful results for the relatively heavily fouled bottom area.

Different from particle segmentation-based approaches, this presently disclosed subject matter focuses on the entire image of each sample. From FIGS. 6(a) through 6(f), it is easy to observe that more voids are occupied by fines with samples having higher FI. The ratio between the "clean" area and "fouled" area could intuitively suggest the fouling condition, regardless of where the fines accumulate. Hence, particle segregation or the heterogenous distribution of the fines would not be an issue if the image analysis focuses on all the pixels of the entire image instead of big particles only.

RGB Value Distribution

Figures 7A, 7B, 7C:
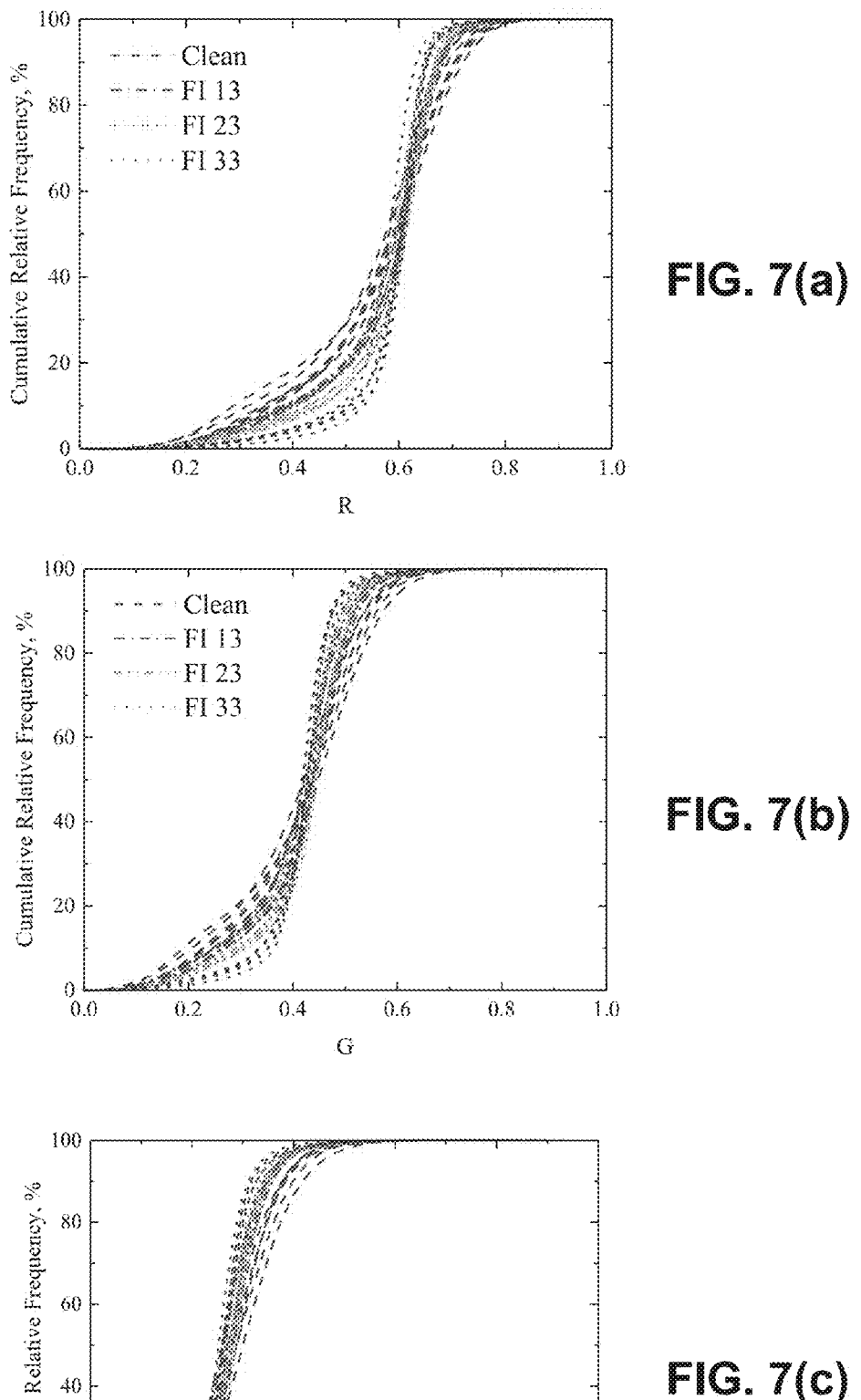
FIGS. 7(a) through 7(c) respectively graphically display all twenty-four cumulative relative-to-frequency curves generated from different fouling conditions (FIGS. 6(a) through 6(f)) for three different color channels.

By converting every image into RGB values, the cumulative relative frequency of each channel color can be calculated and plotted. FIGS. 7(a) through 7(c) respectively graphically display all twenty-four cumulative relative-to-frequency curves generated from different fouling conditions (FIGS. 6(a) through 6(f)) for three different color channels. Taking the Red channel as an example, such twenty-four curves in FIG. 7(a) show clear counterclockwise rotation with increased FI. For a large FI, the curves get slimmer, representing a less dispersed distribution. The intuitive reason is that the difference between the voids and big particles is more apparent when the content of fines is smaller. For heavier fouled ballast, the image appears to be more consistent with the appearance of fines, see FIGS. 6(a) through 6(f). Such trend holds not only for the Red channel but also for the Green and Blue channels. Therefore, a hypothesis can be made that six curves are the sampling results of a certain probability distribution for each fouling condition. Furthermore, the probability distribution of each color channel could be a function of the fouling condition.

Since a consistent trend is observed in FIGS. 7(a) through 7(c), it is reasonable to combine six image values for each fouling condition. Then, the approximated probability distributions can be obtained. As shown, FIGS. 8(a) through 8(c) respectively graphically illustrate cumulative probability distributions under different fouling conditions of different color channels. Apart from the changes in curve shape under different fouling conditions, the positions of curves of different color channels are also different. Obviously, the intensity of the Red channel is the largest, followed by the intensity of the Green channel, and the intensity of the Blue channel is the weakest. These are the conjugated results of the illumination and the mineralogy of ballast materials. During the tests, illumination conditions are controlled, and the ballast materials are all sample Rainy Section materials. Besides, the degree of distribution curve dispersion shrinks with the sequence of Red, Green, and Blue channels. It means that the Red channel's results can be the most dominant in this present disclosure.

Statistical Quantity Evaluation

Figure 8A:
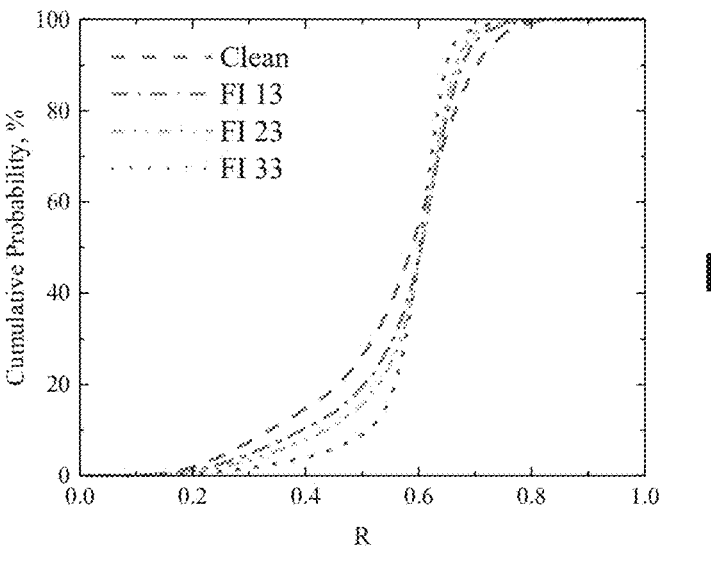
FIGS. 8(a) through 8(c) respectively graphically illustrate cumulative probability distributions under different fouling conditions of different color channels.
Figure 8B:
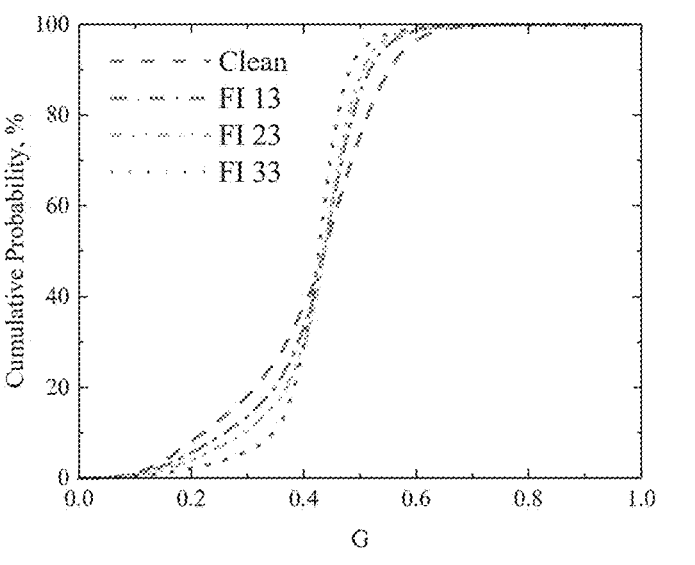
Figure 8C:
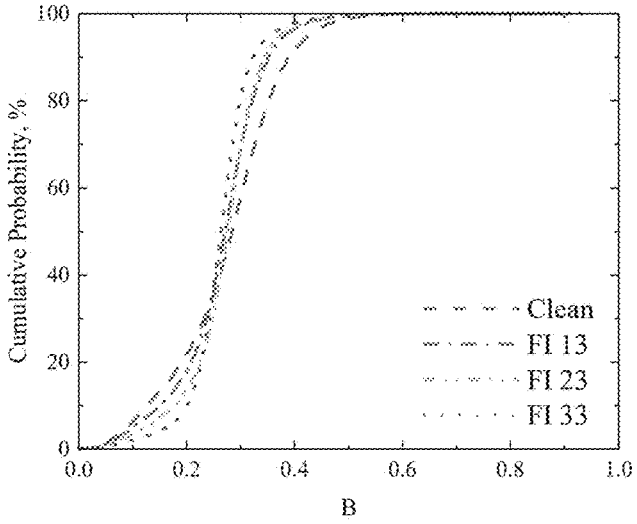

Although the changes in distribution curves can be seen in FIGS. 8(a) through 8(c), the quantitative analysis should be performed to provide explicit correlations. Following the definition in Equations (1) through (5) as stated herein, calculated statistical quantities are presented respectively in graphical form in FIGS. 9(a) through 9(e), respecting FI for three color channels.

Figures 9A, 9B, 9C, 9D, 9E:
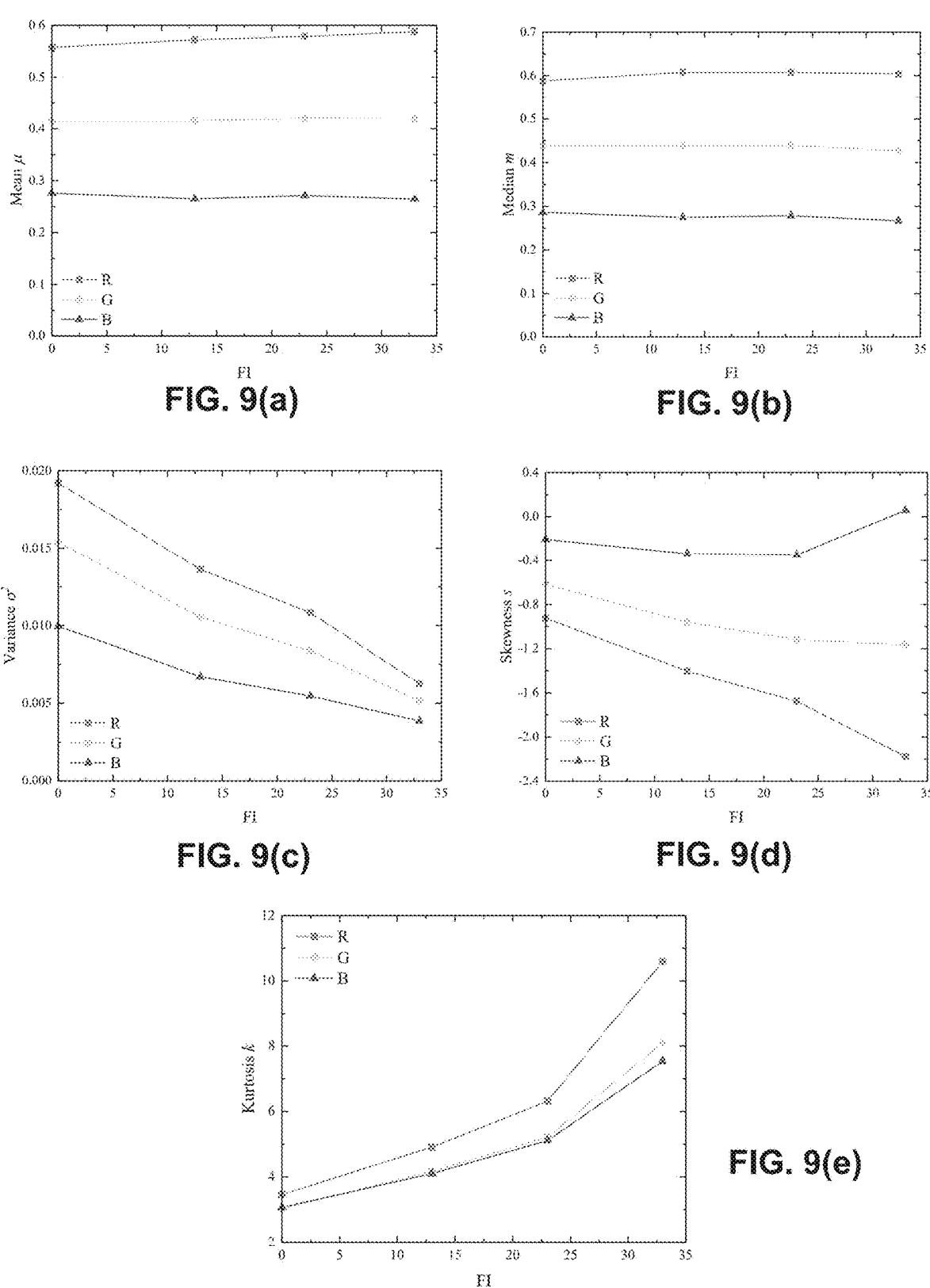
FIGS. 9(a) through 9(e) graphically represented calculated statistical quantities following the definitions in Equations (1) through (5) as stated herein, respecting FI for three color channels.

FIGS. 9(a) and 9(b) respectively illustrate that Mean or Median for each color channel remains stable when FI changes from 0 to 33. It means that Mean or Median is irrelevant to the fouling conditions. FIG. 9(c) graphically illustrates a strong linear correlation between FI and Variance for each color channel, and the Red channel has the most significant value change of Variance when FI changes from 0 to 33. Skewness graphically plotted in FIG. 9(d) indicates that the variation trend of Skewness with increasing FI is inconsistent for different color channels. Hence, Skewness will not be considered in the FI prediction model, and future investigation of such phenomenon will be needed. FIG. 9(e) graphically indicates that Kurtosis is a non-linear monotonic increasing function of FI. Given that only four FI values are prepared to build the FI prediction model, the non-linearity embedded in this Kurtosis-FI relationship cannot be well captured.

Fouling Index Prediction and Validation

Based on the results of FIGS. 9(a) through 9(e), Variance is a suitable statistical parameter to predict FI under controlled illumination conditions. FIG. 9(c) indicates Variance is linearly related to FI, meaning FI is linearly related to Variance. This linear function is adopted to predict FI based on Variance of color channel distribution:

$$FI_C = a\sigma_C^2 + b \tag{6}$$

where the subscript C represents a color channel.

After performing the linear regression analysis, the values of Slope a, Intercept b, and $R^2$, are listed in Table 2. The values of $R^2$ show that these linear functions are good models to predict FI with Variance, and the Red channel is the best candidate with the largest $R^2$ value.

TABLE 2

| Linear Fitting Results Between FI and Variance for Different Color Channels | | | |
|---|---|---|---|
| Channel | Slope a | Intercept b | $R^2$ |
| R | −2597.51193 | 49.67336 | 0.990 |
| G | −3274.06369 | 49.53459 | 0.987 |
| B | −5392.95253 | 52.2989 | 0.965 |

Figure 10A:
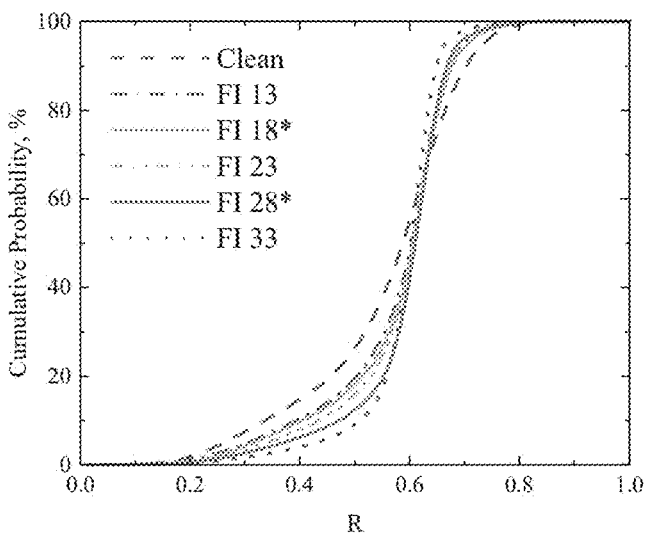
FIGS. 10(a) through 10(c) respectively graphically illustrate cumulative probability distributions with validation fouling conditions of different color channels.
Figure 10B:
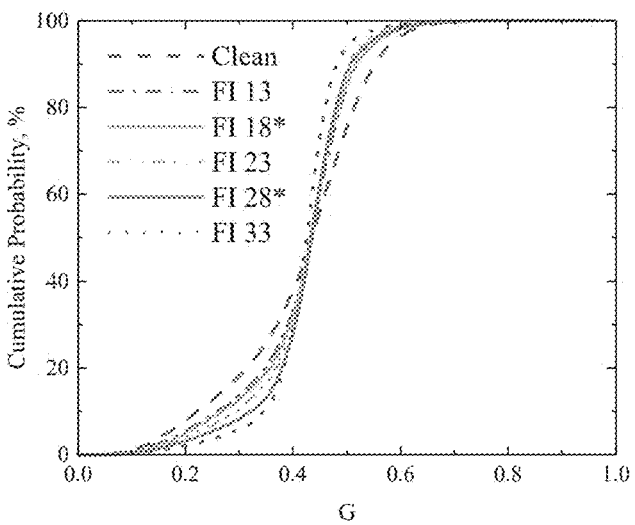
Figure 10C:
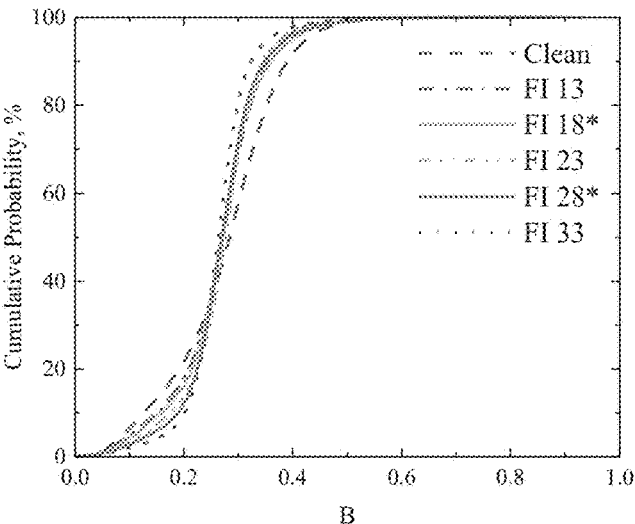

As shown in FIGS. 6(*a*) through 6(*f*), validation cases, FI 18\* and FI 28\*, appear to follow the trend of color change with different fouling conditions. By assembling all the six images, the cumulative probability distribution curves of FI 18\* and FI 28\* can be plotted together with other cases to check if the trend is followed or not. FIGS. 10(*a*) through 10(*c*) respectively graphically illustrate all the probability curves of six different fouling conditions, including the two validation cases. In other words, FIGS. 10(*a*) through 10(*c*) respectively graphically illustrate cumulative probability distributions with validation fouling conditions of different color channels.

FIGS. 10(*a*) through 10(*c*) collectively confirm that the two validation cases well fit the pattern observed for all three color channels. The distribution curve of FI 18\* falls between the curves of FI 13 and FI 23, and the curve of FI 28\* falls between those of FI 23 and FI 33.

Figure 11:
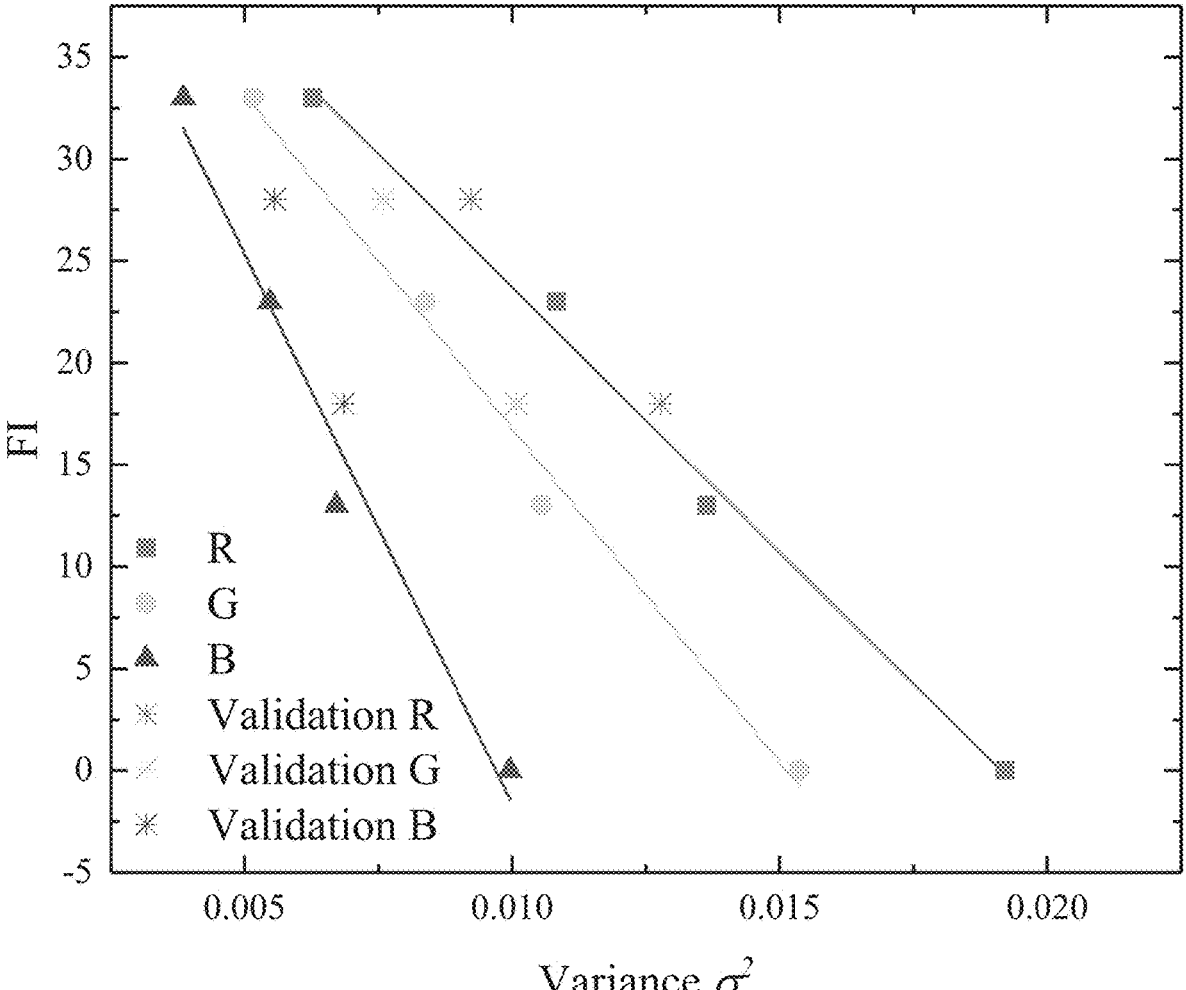
FIG. 11 graphically represents Variance values of two validation fouling conditions when calculated and plotted.

Based on the definition in Equation (3) otherwise listed herein, Variance values of two validation fouling conditions are calculated and plotted in FIG. 11. In FIG. 11, filled markers are the data points for modeling, three lines are the linear regression models, and star markers are the data points for model validation. The linear relationship between Variance and FI holds for validation cases, although the predicted values of FI are underestimated a bit. For predicted results from different channels, the Red channel shows the best prediction, followed by the Green channel, and the performance of the Blue channel is behind. Variance of the Red channel for Clean ballast is the largest among the three color channels, and Variance is non-negative. Hence, the Variance curve of the Red channel is the most sensitive to the change of FI, which results in Variance of the Red channel as a better prediction model. Besides, this ranking may not be universal because only one illumination condition and one ballast material are used in this present disclosure.

The predicted FI values according to the linear Variance-FI relationships are listed in Table 3. It can be noticed that all FI values are underestimated a bit for both fouling conditions. The error is acceptable considering the field practice.

TABLE 3

Performance of RGB-based FI Prediction Model

| Channel | Ground Truth: FI 18 | | Ground Truth: FI 28 | |
|---|---|---|---|---|
| | Predicted FI | Error | Predicted FI | Error |
| R | 16.5 | −1.5 | 25.7 | −2.3 |
| G | 16.5 | −1.5 | 24.7 | −3.3 |
| B | 15.4 | −2.6 | 22.4 | −5.6 |

According to the fouling category proposed by Selig and Waters (1), ballast is Moderately Fouled with FI ranging from 10 to 19 and is Fouled with FI ranging from 20 to 39. The fouling status of FI 18 and FI 28 can be classified with the results shown in Table 3. Table 4 shows that this RGB-based model performs well in fouling status classification.

TABLE 4

Performance of RGB-based Fouling Category Prediction Model

| Channel | Ground Truth: FI 18 | | Ground Truth: FI 28 | |
|---|---|---|---|---|
| | True Category | Predicted Category | True Category | Predicted Category |
| R | Moderately | Moderately Fouled | Fouled | Fouled |
| G | Fouled | Moderately Fouled | | Fouled |
| B | | Moderately Fouled | | Fouled |

CONCLUSIONS

This present disclosure acquires images of the same ballast materials having different fouling conditions. The images share a consistent illumination condition, and RGB-based analysis is performed. Based on the limited results, the following conclusions can be drawn:

1. Ballast with different fouling conditions shows different visual effects. Big particles are easier to be distinguished when the ballast is relatively less fouled. When the fine content increases, a higher portion of the fouled ballast image is occupied by fines, leading to a more consistent appearance.

2. Every color image has three color channels, Red, Green, and Blue. No matter which channel, the color frequency distribution changes with the increase of FI. The channel values of a heavier fouled ballast tend to have a less diverged frequency distribution.

3. Five statistical quantities, Mean, Median, Variance, Skewness, and Kurtosis, are calculated. Among these five quantities, Variance shows a strong linear relationship to FI, and Skewness or Kurtosis changes non-linearly. Mean and Median are stable.

4. An FI prediction model is established based on the Variance of color channels. The established FI prediction model is tested and validated by additional fouled ballast materials and shows promising performance.

5. The good prediction results of fouling conditions show the potential of this method for further development for prediction with different illumination conditions, ballast particle mineralogizes, and fouling materials.

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements with insubstantial differences from the literal languages of the claims.

REFERENCES

[1] Selig, E. T., and J. M. Waters. *Track geotechnology and substructure management*. Thomas Telford, 1994.

[2] Tutumluer, E., W. Dombrow, and H. Huang. Laboratory characterization of coal dust fouled ballast behavior. In *AREMA* 2008 *Annual Conference & Exposition,* 2008. pp. 21-24.

[3] Tennakoon, N., and B. Indraratna. Behaviour of clay-fouled ballast under cyclic loading. *Géotechnique*, Vol. 64, No. 6, 2014, pp. 502-506.

[4] Kashani, H. F., J. P. Hyslip, and C. L. Ho. Laboratory evaluation of railroad ballast behavior under heavy axle load and high traffic conditions. *Transportation Geotechnics*, Vol. 11, 2017, pp. 69-81.

[5] Kashani, H. F., C. L. Ho, and J. P. Hyslip. Fouling and water content influence on the ballast deformation properties. *Construction and Building Materials*, Vol. 190, 2018, pp. 881-895.

[6] Qian, Y., E. Tutumluer, Y. M. Hashash, and J. Ghaboussi. Triaxial testing of new and degraded ballast under dry and wet conditions. *Transportation Geotechnics*, Vol. 34, 2022, p. 100744.

[7] Indraratna, B., W. Salim, and C. Rujikiatkamjorn. *Advanced rail geotechnology-ballasted track.* CRC press, 2011.

[8] Sussmann, T. R., M. Ruel, and S. M. Chrismer. Source of ballast fouling and influence considerations for condition assessment criteria. *Transportation Research Record*, Vol. 2289, No. 1, 2012, pp. 87-94.

[9] Han, X., and E. Selig. Investigation of the effects of fouling material and degree of fouling on the settlement of ballast bed by ballast box. *Project Report No. AAR95-426R for Association of American Railroads.* University of Massachusetts, Amherst, 1996.

[10] Ionescu, D. Ballast degradation and measurement of ballast fouling. In *Seventh Railway Engineering Conference*, Commonwealth Institute, London, 2004. pp. 169-180.

[11] Qian, Y., H. Boler, M. Moaveni, E. Tutumluer, Y. M. Hashash, and J. Ghaboussi. Characterizing ballast degradation through Los Angeles abrasion test and image analysis. *Transportation Research Record*, Vol. 2448, No. 1, 2014, pp. 142-151.

[12] Hyslip, J. P., S. S. Smith, G. R. Olhoeft, and E. T. Selig. Assessment of railway track substructure condition using ground penetrating radar. In 2003 *Annual Conference of AREMA*, Citeseer, 2003.

[13] Roberts, R., J. Rudy, I. Al-Qadi, E. Tutumluer, and J. Boyle. Railroad ballast fouling detection using ground penetrating radar-a new approach based on scattering from voids. In *Ninth European Conference on NDT*, Citeseer, 2006.

[14] Leng, Z., and I. L. Al-Qadi. Railroad ballast evaluation using ground-penetrating radar: laboratory investigation and field validation. *Transportation Research Record*, Vol. 2159, No. 1, 2010, pp. 110-117.

[15] De Bold, R., D. Connolly, S. Patience, M. Lim, and M. Forde. Using impulse response testing to examine ballast fouling of a railway trackbed. *Construction and Building Materials*, Vol. 274, 2021, p. 121888.

[16] Sussmann Jr, T., H. Thompson II, T. Stark, S. Wilk, and C. Ho. Use of seismic surface wave testing to assess track substructure condition. *Construction and Building Materials*, Vol. 155, 2017, pp. 1250-1255.

[17] Stark, T. D., S. T. Wilk, H. B. Thompson, T. R. Sussmann Jr, M. Baker, and C. L. Ho. Evaluating fouled ballast using seismic surface waves. In ASME/IEEE Joint Rail Conference, No. 49675, American Society of Mechanical Engineers, 2016. p. V001T001A002.

[18] Zeng, K., T. Qiu, X. Bian, M. Xiao, and H. Huang. Identification of ballast condition using SmartRock and pattern recognition. *Construction and Building Materials*, Vol. 221, 2019, pp. 50-59.

[19] Sigworth, F. J. A maximum-likelihood approach to single-particle image refinement. *Journal of structural biology*, Vol. 122, No. 3, 1998, pp. 328-339.

[20] Al-Thyabat, S., and N. Miles. An improved estimation of size distribution from particle profile measurements. *Powder technology*, Vol. 166, No. 3, 2006, pp. 152-160.

[21] Mertens, G., and J. Elsen. Use of computer assisted image analysis for the determination of the grain-size distribution of sands used in mortars. *Cement and Concrete Research*, Vol. 36, No. 8, 2006, pp. 1453-1459.

[22] Liu, X., C. Zhang, and J. Zhan. Quantitative comparison of image analysis methods for particle mixing in rotary drums. *Powder technology*, Vol. 282, 2015, pp. 32-36.

[23] Zhang, Z. Particle overlapping error correction for coal size distribution estimation by image analysis. *International Journal of Mineral Processing*, Vol. 155, 2016, pp. 136-139.

[24] Zheng, J., and R. Hryciw. Soil particle size and shape distributions by stereophotography and image analysis. *Geotech. Test. J*, Vol. 40, No. 2, 2017, pp. 317-328.

What is claimed is:

1. A method for evaluating railway ballast fouling conditions for assessing track conditions for determining proper ballast maintenance, the method comprising:

training a machine-learned computer vision-based convolutional neural network (CNN) model to directly estimate ballast fouling conditions using an image analysis approach based on overall image characteristics;

obtaining an overall image associated with a target section of railway ballast to be evaluated;

inputting the overall image associated with the target section of railway ballast into the machine-learned computer vision-based convolutional neural network (CNN) model; and receiving, as output of the CNN model, estimation of the ballast fouling conditions of the target section of railway ballast, wherein training the machine-learned computer vision-based convolutional neural network (CNN) model to directly estimate ballast fouling conditions is established based on the correlation between fouling severity and Variance of a statistical analysis of a planar sample of a target section of railway ballast.

2. The method according to claim 1, wherein the image analysis approach comprises evaluating fine particles in the overall image of the target section of railway ballast.

3. The method according to claim 2, wherein fine particles comprise particles finer than 1 mm.

4. The method according to claim 1, wherein the overall image associated with the target section of railway ballast comprises the combination of ballast particles, fines, and voids therebetween.

5. The method according to claim 4, wherein the image analysis approach comprises focusing on all the pixels of the entire overall image.

6. The method according to claim 4, wherein the image analysis approach comprises quantifying the overall image appearance based on the frequency distributions of a plurality of color channels.

7. The method according to claim 6, wherein the plurality of color channels comprise red, green, and blue, respectively.

8. The method according to claim 1, wherein the training comprises:

taking as reference fouled ballast images with different fouling conditions;

processing red/green/blue (RGB) color distributions of the reference fouled ballast images through statistical analysis; and determining strong linear correlation between a Fouling Index (FI) and Variance of the statistical analysis to establish an FI prediction model.

9. The method according to claim 8, wherein Variance s² of the statistical analysis of a planar sample of a target section of railway ballast comprises $$\sigma^2 = \frac{1}{N}\sum_{i=1}^{N}(x_i - \mu)^2$$

where N=(image count)×width of sample×height of sample.

10. A system for evaluating railway ballast fouling conditions for assessing track conditions for determining proper ballast maintenance, comprising:

a machine-learned computer vision-based convolutional neural network (CNN) model trained to directly estimate ballast fouling conditions using an image analysis approach based on overall image characteristics;

one or more processors; and one or more non-transitory computer-readable media that store instructions that, when executed by the one or more processors, cause the one or more processors to perform operations, the operations comprising:

obtaining an overall image associated with a target section of railway ballast to be evaluated;

inputting the overall image associated with the target section of railway ballast into the machine-learned computer vision-based convolutional neural network (CNN) model; and receiving, as output of the CNN model, estimation of the ballast fouling conditions of the target section of railway ballast, wherein training the machine-learned computer vision-based convolutional neural network (CNN) model to directly estimate ballast fouling conditions is established based on the correlation between fouling severity and Variance of a statistical analysis of a planar sample of a target section of railway ballast.

11. The system according to claim 10, wherein the operations further comprise evaluating fine particles in the overall image of the target section of railway ballast.

12. The system according to claim 11, wherein fine particles comprise particles finer than 1 mm.

13. The system according to claim 10, wherein the overall image associated with the target section of railway ballast comprises the combination of ballast particles, fines, and voids therebetween.

14. The system according to claim 13, wherein the operations further comprise focusing on all the pixels of the entire overall image.

15. The system according to claim 13, wherein the operations further comprise quantifying the overall image appearance based on the frequency distributions of a plurality of color channels.

16. The system according to claim 15, wherein the plurality of color channels comprise red, green, and blue, respectively.

17. The system according to claim 10, wherein training the machine-learned computer vision-based convolutional neural network (CNN) model comprises:

taking as reference fouled ballast images with different fouling conditions;

processing red/green/blue (RGB) color distributions of the reference fouled ballast images through statistical analysis; and determining strong linear correlation between a Fouling Index (FI) and Variance of the statistical analysis to establish an FI prediction model.

18. The system according to claim 17, wherein Variance s² of the statistical analysis of a planar sample of a target section of railway ballast comprises $$\sigma^2 = \frac{1}{N}\sum_{i=1}^{N}(x_i - \mu)^2$$

where N=(image count)×width of sample×height of sample.

19. A method for evaluating railway ballast fouling conditions for assessing track conditions for determining proper ballast maintenance, the method comprising:

training a machine-learned computer vision-based convolutional neural network (CNN) model to directly estimate ballast fouling conditions using an image analysis approach based on overall image characteristics;

obtaining an overall image associated with a target section of railway ballast to be evaluated;

inputting the overall image associated with the target section of railway ballast into the machine-learned computer vision-based convolutional neural network (CNN) model; and receiving, as output of the CNN model, estimation of the ballast fouling conditions of the target section of railway ballast, wherein the training comprises:

taking as reference fouled ballast images with different fouling conditions;

processing red/green/blue (RGB) color distributions of the reference fouled ballast images through statistical analysis; and determining strong linear correlation between a Fouling Index (FI) and Variance of the statistical analysis to establish an FI prediction model.

20. The method according to claim 19, wherein Variance s² of the statistical analysis of a planar sample of a target section of railway ballast comprises $$\sigma^2 = \frac{1}{N}\sum_{i=1}^{N}(x_i - \mu)^2$$

where N=(image count)×width of sample×height of sample.

* * * * *